US012749224B2

(12) United States Patent
Mohalik et al.

(10) Patent No.: US 12,749,224 B2
(45) Date of Patent: Sep. 29, 2026

(54) COMPRESSION OF XR DATA META-FRAMES COMMUNICATED THROUGH NETWORKS FOR RENDERING BY XR DEVICES AS AN XR ENVIRONMENT

(71) Applicant: Telefonaktiebolaget LM Ericsson (publ), Stockholm (SE)

(72) Inventors: Swarup Kumar Mohalik, Bangalore (IN); Amin Azari, Järfälla (SE); Peter Vaderna, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

(21) Appl. No.: 18/842,002

(22) PCT Filed: Mar. 15, 2022

(86) PCT No.: PCT/EP2022/056589
§ 371 (c)(1),
(2) Date: Aug. 27, 2024

(87) PCT Pub. No.: WO2023/174513
PCT Pub. Date: Sep. 21, 2023

(65) Prior Publication Data
US 2025/0182335 A1 Jun. 5, 2025

(51) Int. Cl.
*G06T 9/00* (2006.01)
*G06F 3/01* (2006.01)

(52) U.S. Cl.
CPC ................ *G06T 9/00* (2013.01); *G06F 3/013* (2013.01)

(58) Field of Classification Search
CPC ......... G06T 9/00; G06T 19/006; G06F 3/013; G06F 3/011; G06F 3/167; G06F 3/012;
(Continued)

(56) References Cited

U.S. PATENT DOCUMENTS 10,789,764 B2 9/2020 Rowley
11,748,056 B2 * 9/2023 Berliner ................. G09G 3/001 345/156
(Continued)

FOREIGN PATENT DOCUMENTS

WO 2021101775 A1 5/2021

OTHER PUBLICATIONS

International Search Report and Written Opinion of the International Searching Authority, PCT/EP2022/056589, mailed Oct. 14, 2022, 14 pages.
(Continued)

*Primary Examiner* — Vijay Shankar
(74) *Attorney, Agent, or Firm* — Sage Patent Group

(57) ABSTRACT

An XR environment server communicates XR data meta-frames to an XR device for rendering as an XR environment. The XR environment server includes a network interface, at least one processor, and at least one memory storing instructions executable by the at least one processor to perform operations. The operations include obtaining input XR data meta-frames which define objects for rendering through the XR device as the XR environment to a user, and determining relevance of individual objects to interests of the user of the XR device. The operations adjust renderable details of the individual objects responsive to the determined relevance to the interests of the user to the individual objects, and generate compressed output XR data meta-frames from the input XR data meta-frames based on the adjusted renderable details of the individual objects. The operations communicate the compressed output XR data meta-frames toward the XR device for rendering.

20 Claims, 7 Drawing Sheets

(58) Field of Classification Search
CPC ......... G06F 3/016; G06F 3/165; G06N 3/006; G06N 3/0464; G06N 3/0499; G06N 3/092; H04N 19/124; H04N 19/167; H04N 19/17
See application file for complete search history.

(56) References Cited

U.S. PATENT DOCUMENTS

| | | | | | |
|---|---|---|---|---|---|
| 11,829,524 | B2 * | 11/2023 | Elhadad | ................. | G09G 3/001 |
| 11,941,149 | B2 * | 3/2024 | Dolev | ..................... | G06T 13/40 |
| 11,954,258 | B1 * | 4/2024 | Agrawal | ................. | G06F 3/167 |
| 12,175,614 | B2 * | 12/2024 | Rudman | ................ | G06V 10/25 |
| 12,265,655 | B2 * | 4/2025 | Elhadad | .................. | G10L 15/22 |
| 2018/0350136 | A1 * | 12/2018 | Rowley | ..................... | G06T 7/73 |
| 2025/0095302 | A1 * | 3/2025 | Wetmore | ................ | G06F 3/013 |

OTHER PUBLICATIONS

Wikipedia, Foveated rendering, downloaded on Jun. 1, 2021 from the Internet: https://en.wikipedia.org/w/index.php?title=Foveated_rendering&oldid=1026246141, 3 pages.
Yonga, Franck et al., "Improving video communication in distributed smart camera systems through ROI-based video analysis and compression," IEEE, 2012 Sixth International Conference on Distributed Smart Cameras (ICDSC), Hong Kong, China, 2012, 6 pages.

* cited by examiner

COMPRESSION OF XR DATA META-FRAMES COMMUNICATED THROUGH NETWORKS FOR RENDERING BY XR DEVICES AS AN XR ENVIRONMENT

CROSS REFERENCE TO RELATED APPLICATIONS

This application is a 35 U.S.C. § 371 national stage application of PCT International Application No. PCT/EP2022/056589 filed on Mar. 15, 2022, the disclosure and content of which is incorporated by reference herein in its entirety.

TECHNICAL FIELD

The present disclosure relates to rendering extended reality (XR) environments and associated XR rendering devices, and more particularly to communication of XR data meta-frames from networked XR applications.

BACKGROUND

Immersive extended reality (XR) environments have been developed which provide a myriad of different types of user experiences for gaming, on-line meetings, social networking, co-creation of products, etc. Immersive XR environments (also referred to as "XR environments") can include virtual reality (VR) environments where human users only see computer generated graphical renderings, and augmented reality (AR) environments where users see a combination of computer-generated graphical renderings overlaid on a view of the physical real-world through, e.g., see-through display screens.

Immersive XR environments, such as gaming environments and meeting environments, can be configured to display computer generated avatars which represent poses of human users in the immersive XR environments. Example XR environment rendering devices (also called "XR devices") include, without limitation, XR headsets, gaming consoles, smartphones, and tablet/laptop/desktop computers. Oculus Quest is an example VR device and Google Glass is an example AR device.

When an XR device renders objects to form an XR environment in real-time or near-real-time the operations put a tremendous load on the computational resources of the XR device. Various technical approaches are directed to reducing or constraining the computational requirements of XR devices when locally rendering objects to form an XR environment.

One approach is known as foveated rendering where an XR headset uses eye tracking to determine where a user's eyes are directed relative to a region of the XR environment displayed on a head-mounted display, and responsively renders higher resolution detail (e.g., image and/or video detail) for the region corresponding to the user's primary eye focus while reducing the rendered resolution detail outside the user's primary eye focus, such as within the user's peripherical vision.

Another approach is referred to as fixed foveated rendering which controls rendered resolution detail based on a fixed focal orientation relative to the user's location within the XR environment.

Another approach assumes a fixed rendering depth, where objects that are within a fixed distance of the user's location in the XR environment are rendered with higher resolution detail relative to other objects that are located beyond the fixed distance. For example, spherical rendering (i.e. 360-sphere) operates to provide high resolution rendering within the sphere. The larger the distance (e.g., radius) of "the high-resolution sphere" that is defined around the user, the greater the computational rendering load that is required from the XR device. Although spherical rendering can provide a high user quality of experience for panning, image-tracking and/or mobility, etc., the computational requirements can exceed the capacity of commercially available or viable XR devices.

SUMMARY

Some embodiments disclosed herein are directed to an XR environment server which communicates XR data meta-frames through networks to an XR device for rendering as an XR environment. The XR environment server includes a network interface configured to communicate through the networks, at least one processor, and at least one memory storing instructions executable by the at least one processor to perform operations. The operations include obtaining input XR data meta-frames which define objects for rendering as the XR environment through the XR device to a user, and determining relevance of the individual objects to interests of the user of the XR device. The operations adjust renderable details of the individual objects responsive to the determined relevance to the interests of the user to the individual objects, and generate compressed output XR data meta-frames from the input XR data meta-frames based on the adjusted renderable details of the individual objects. The operations communicate the compressed output XR data meta-frames through the network interface toward the XR device for rendering through the XR device.

Some other embodiments are directed to a corresponding method for communicating XR meta-frames from an XR environment server through a network to an XR device for rendering as an XR environment. The method includes obtaining input XR data meta-frames which define objects for rendering as the XR environment through the XR device to a user, and determining relevance of the individual objects to interests of the user of the XR device. The method further includes adjusting renderable details of the individual objects responsive to the determined relevance to the interests of the user to the individual objects, and generating compressed output XR data meta-frames from the input XR data meta-frames based on the adjusted renderable details of the individual objects. The method further includes communicating the compressed output XR data meta-frames through the network interface toward the XR device for rendering through the XR device.

Potential advantages that may be provided by these and further embodiments disclosed herein include more efficient utilization and overall reduction in the network resources which are used to communicate XR data meta-frames toward XR devices for rendering as an XR environment. Compression of the XR data meta-frames through adjusting the renderable details of objects based on their determined relevance to the interests of the user, enables the user's experience to be optimized while enabling substantial reduction in the network resource loading. Moreover, when physical resources are consumed to render smells (e.g., various scent resources dispensed by a scent generator), tastes (e.g., various taste resources dispensed by a taste generator), etc. at the XR device, reducing the renderable details can conserve those physical resources. Renderable details correspond to objects or characteristics (examples of objects include video, audio and characteristics include smell, taste and the like) present in the XR meta-frames that can be rendered for display. For example, reducing the renderable details can correspond to reducing the quantity of different scents and/or intensities of different scents that are dispensed by a taste generator of the XR device, and/or can correspond to reducing the types of different smells and/or intensities of different smells that are dispensed by a smell generator of the XR device (range of smells, good or bad). In another example, adjusting renderable detail correspond to reducing number or pixels of video objects of a video data component which are to be displayed by a display of the XR device. Thus, users can perceive improved quality XR experiences which are obtained while using lower bandwidth network services (with adjusted renderable details) and/or while consuming fewer physical resources for rendering Other XR environment servers and methods according to embodiments will be or become apparent to one with skill in the art upon review of the following drawings and detailed description. It is intended that all such additional XR environment servers and methods be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
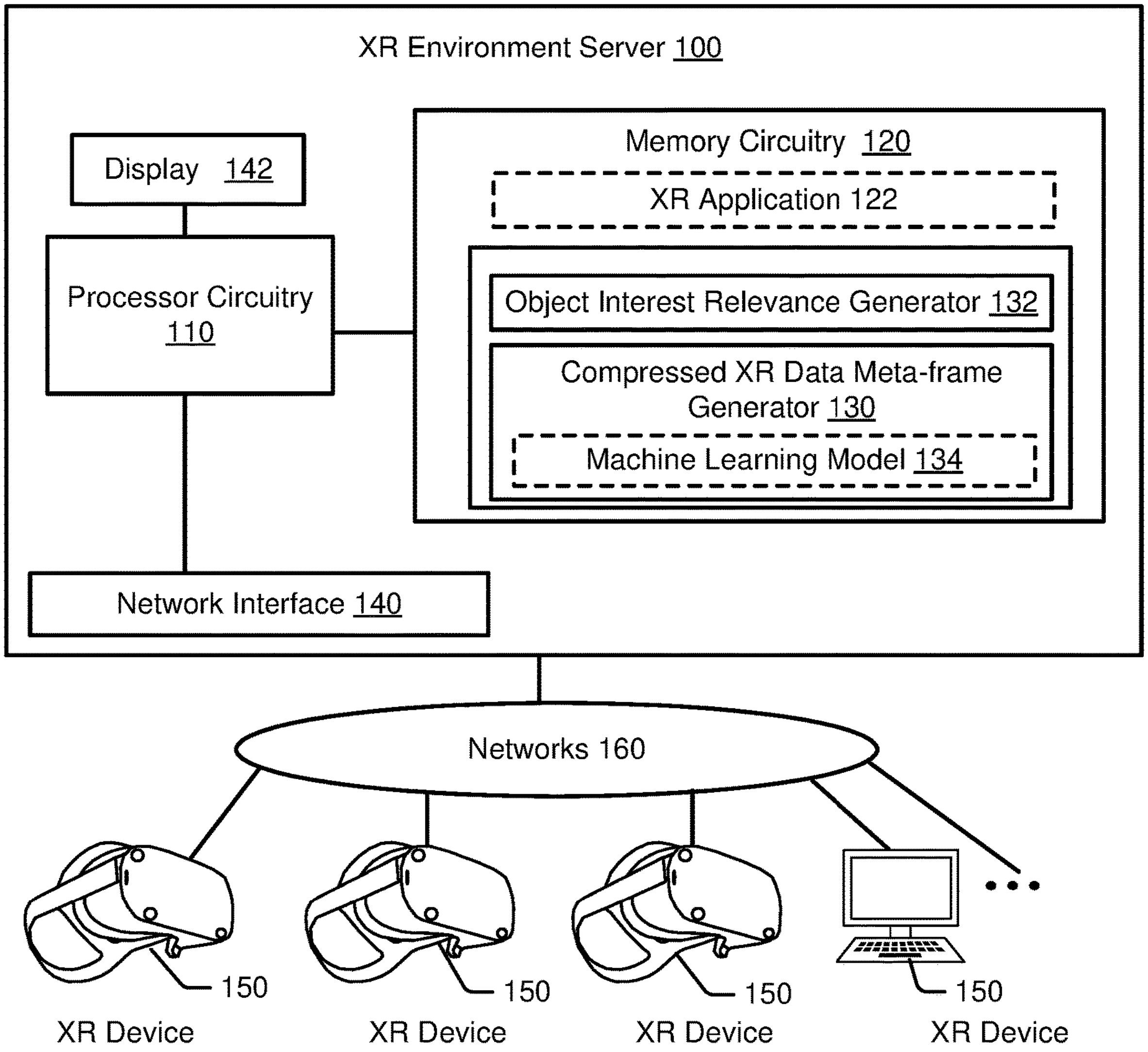
FIG. 1 illustrates an XR system that includes an XR environment server which communicates compressed XR data meta-frames through networks to various XR devices for rendering as an XR environment, in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Potential problems that can arise with prior approaches are explained. Foveated rendering can render parts of the scene in high resolution depending upon eye tracking. Although this can be used to optimize the XR information communicated from a content provider, foveated rendering operations address only video information, and how the video information is rendered by an XR device. The computation and communication details are not addressed and, much less, does not address how the network bandwidth to the XR device can be optimally controlled. Foveated rendering is performed on the XR device locally, however, when the objects to be rendered by the XR device are created in a remote networked server, then a large amount of data is necessarily communicated through a network to the XR device. For example, full video frames would still be transferred to the XR device for processing through selective rendering operations based on, e.g., foveated rendering, fixed foveated rendering, fixed rendering depth, etc. at the XR device itself. This results in an inefficient use of the network resources for communication of certain objects contained in the video frames which are rendered at lower resolution or which may not be rendered.

Various embodiments of the present disclosure are directed to more efficiently utilizing and preferably reducing the network resources that are used to communicate XR data meta-frames through networks toward an XR device for rendering as an XR environment. The embodiments determine relevance of the individual objects of an XR data meta-frame to interests of a user of the XR device, adjust renderable details of individual objects responsive to their respectively determined relevance to the interests of the user, and generate compressed output XR data meta-frames from the input XR data meta-frames based on the adjusted renderable details of the individual objects.

As will be explained in further detail below, some embodiments use a machine learning model to determine an indicated user interest which may be based on where the users are focused. The associated relevance can be determined for many different types of XR renderable objects, such as video objects, audio objects, taste objects, smell objects, touch feedback objects, temperature feedback objects, etc. Accordingly, when an XR device includes devices capable of generating tastes, smells, and touch feedback (e.g., tactile feedback) to a user as part of rendering the XR environment, the XR data meta-frame having objects (e.g., instruction vectors) for those devices can be compressed by adjusting the renderable object details. The object compression can include adjusting the number of components and/or intensities which are processed by respective devices to generate the combined visual, audible, taste, smell, and touch feedback, so that objects having higher relevance to the user's interests are rendered with higher detail (e.g., fully detail) and other objects having lower relevance to the user's interests are rendered with lower detail or are not included in the compressed XR data meta-frame for communication through the network and rending by the XR device.

Potential advantages that may be provided by these and further embodiments disclosed herein include more efficient utilization and overall reduction in the network resources which are used to communicate XR data meta-frames toward XR devices for rendering as an XR environment. Compression of the XR data meta-frames through adjusting the renderable details of objects based on their determined relevance to the interests of the user, enables the user's experience to be optimized while enabling substantial reduction in the network resource loading. Moreover, when physical resources are consumed to render smells (e.g., various scent resources dispensed by a scent generator), tastes (e.g., various taste resources dispensed by a taste generator), etc. at the XR device, reducing the renderable details can conserve those physical resources. Renderable details correspond to objects or characteristics (examples of objects include video, audio and characteristics include smell, taste and the like) present in the XR meta-frames that can be rendered for display. For example, reducing the renderable details can correspond to reducing the quantity of different scents and/or intensities of different scents that are dispensed by a taste generator of the XR device, and/or can correspond to reducing the types of different smells and/or intensities of different smells that are dispensed by a smell generator of the XR device. In another example, adjusting renderable detail correspond to reducing number or pixels of video objects of a video data component which are to be displayed by a display of the XR device. Thus, users can perceive improved quality XR experiences which are obtained while using lower bandwidth network services (with adjusted renderable details) and/or while consuming fewer physical resources for rendering.

Figure 2:
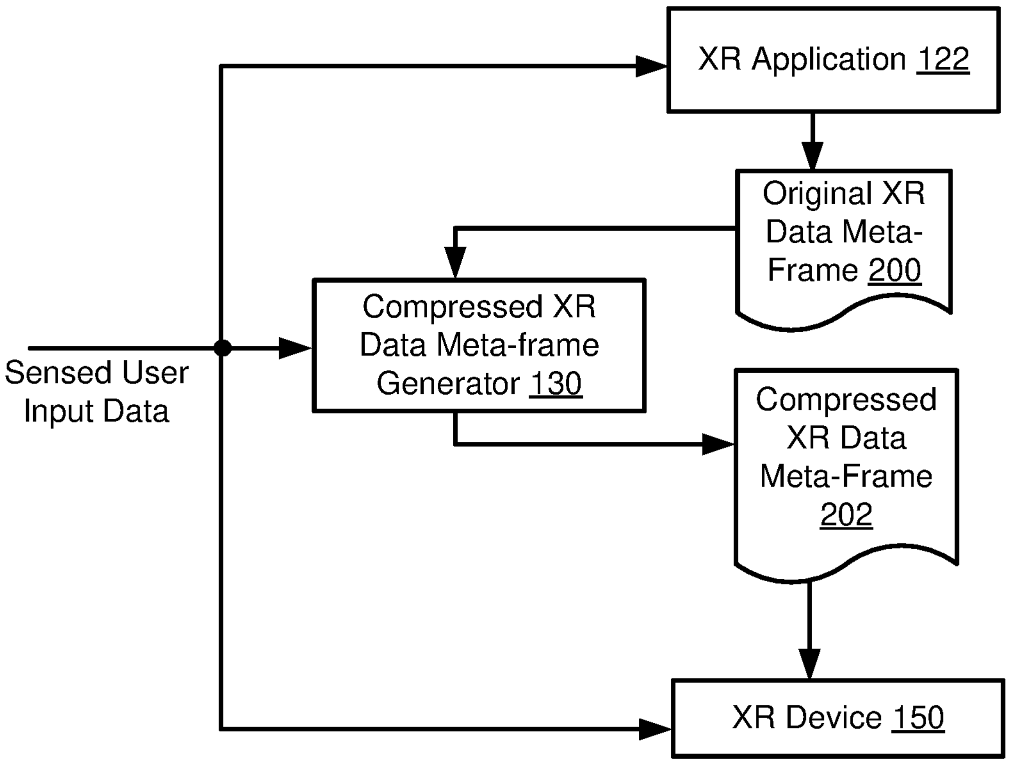
FIG. 2 illustrates operations which generate a compressed XR data meta-frame in accordance with some embodiments.
Figure 4:
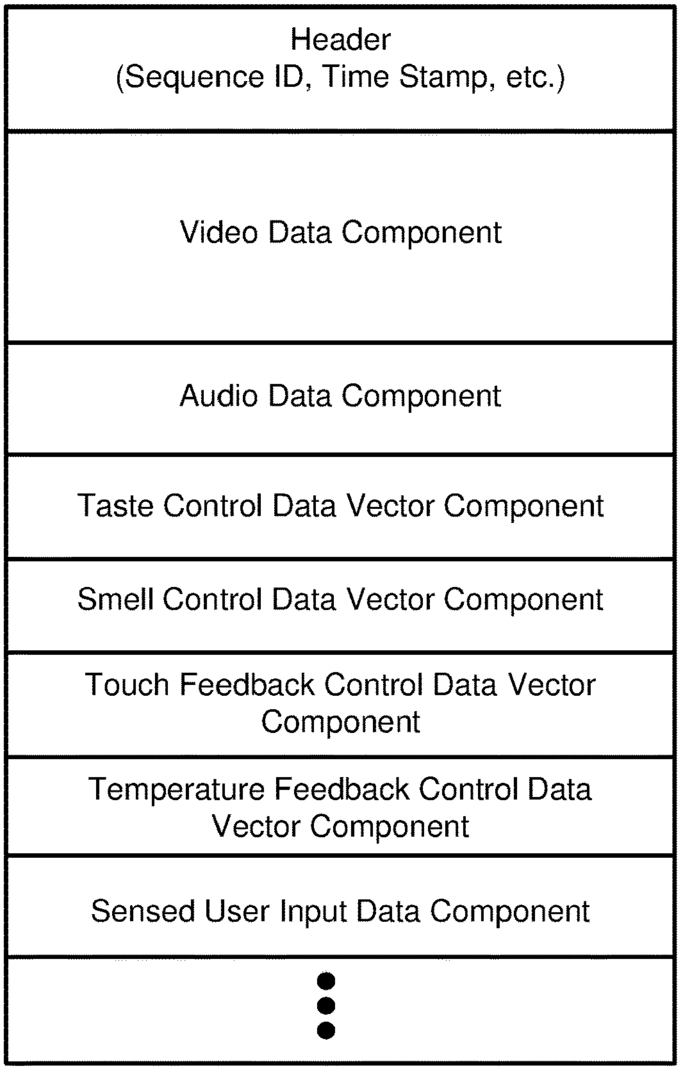
FIG. 4 illustrates components of an example XR data meta-frame in accordance with some embodiments.

Some embodiments of the present disclosure are now explained with reference to FIG. 1. FIG. 1 illustrates an XR system that includes an XR environment server 100 which communicates compressed XR data meta-frames through networks 160 to various XR devices 150 for rendering as an XR environment. FIG. 2 illustrates operations which generate a compressed XR data meta-frame in accordance with some embodiment. FIG. 4 illustrates components of an example XR data meta-frame.

Referring initially to FIGS. 1, 2, and 4, an XR application 122 generates XR data meta-frames 200 containing objects that can be renderable by an XR device 150 to form an XR environment. The XR application 122 may be a VR application, an AR application, etc. which may generate XR data meta-frames 200 for rendering by an XR device 150 in order to provide a user with an immersive XR environment, such as a gaming environment, a social networking environment, an online meeting environment, etc. Example XR devices 150 include, without limitation, XR headsets, gaming consoles, smartphones, and tablet/laptop/desktop computers. The example XR data meta-frame of FIG. 4 which may be generated by the XR application 122 as the XR data meta-frame 200 which can be combined to include the sensed user input data as illustrated in FIG. 2.

The XR data meta-frame 200 is compressed by a compressed-XR data meta-frame generator 130 to generate a compressed output XR data meta-frame from the XR data meta-frame 200. The XR data meta-frame is also referred to as an input XR data meta-frame in order to distinguish it from a compressed XR data meta-frame output by the compressed XR data meta-frame generator 130 as described below. In accordance with various embodiments disclosed herein, the compressed XR data meta-frame generator 130 adjusts renderable details of individual objects of the XR data meta-frames 200 responsive to the respective relevance of the individual objects to interests of a user, and generates the compressed output XR data meta-frames 202 based on the adjusted renderable details of individual objects of the XR data meta-frames 200. The compressed output XR data meta-frames 202 are more compact (i.e., less bits) than the input XR data meta-frames 202 and, therefore, less network resources are used when communicating the compressed output XR data meta-frames 202 through the networks 160, e.g., private networks and/or public networks (e.g., Internet), to one or more of the XR devices 150.

The example XR environment server 100 includes at least one network interface 140 (hereinafter "network interface") configured to communicate through the networks 160, at least one processor circuit 110 (hereinafter "processor"), and at least one memory 120 (hereinafter "memory") storing instructions executable by the processor 110 to perform operations. The XR environment server 100 may include a display 142 and other components, e.g., user input interface. The memory 120 may include the XR application 122 that generates XR data frames which define objects for rendering as the XR environment through an XR device 150 to a user, and may include an object interest relevance generator 132 which may further include a machine learning model 134 as will be explained in further detail below.

Figure 9:
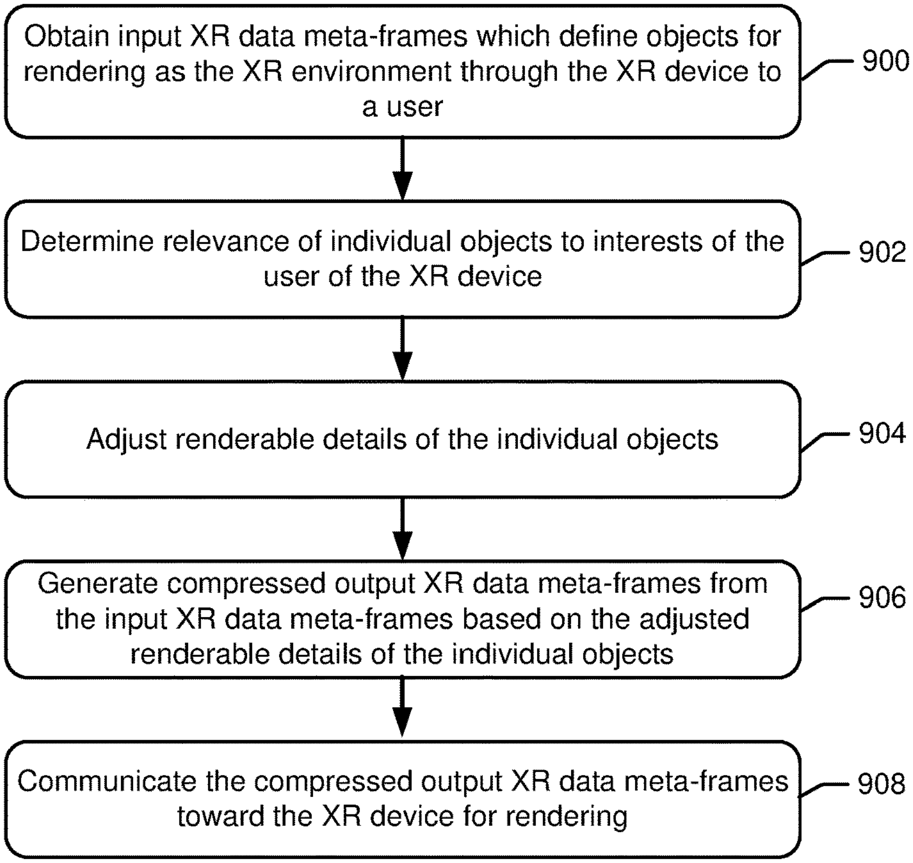
FIG. 9 illustrates a flowchart of operations which may be performed by an XR environment server to generate compressed output XR data meta-frames in accordance with some embodiments.

FIG. 9 illustrates a flowchart of operations which may be performed by the XR environment server 100, via the compressed XR data meta-frame generator 130, to generate compressed output XR data meta-frames in accordance with some embodiments. The illustrated operations include obtaining 900 input XR data meta-frames which define objects for rendering as the XR environment through the XR device 150 (shown in FIG. 1) to a user. The operations determine 902 relevance of the individual objects to interests of the user of the XR device 150. The operations adjust renderable details of the individual objects responsive to the determined relevance to the interests of the user to the individual objects, and generate 906 compressed output XR data meta-frames from the input XR data meta-frames based on the adjusted renderable details of the individual objects. The operations communicate 908 the compressed output XR data meta-frames through the network interface 140 toward the XR device 150 for rendering through the XR device 150 as the XR environment.

The example XR data meta-frame of FIG. 4 includes a header (e.g., sequence identifier (ID), time stamp, etc.), a video data component, an audio data component, a taste control data vector component, a smell control data vector component, a touch feedback control data vector component, a temperature feedback control data vector component, a sensed update input data component, etc. An input XR data meta-frame is not limited to including all of the example components of FIG. 4, but instead may include any one or more of these components and/or include other components defining any type of objects which are renderable by the XR device 150 to a user as part of an XR environment.

The video data component includes video objects which can be rendered by the XR device 150 for display on a display device. The audio data component includes audio objects which can be rendered by the XR device 150 as output to a speaker (e.g., directly connected or networked speaker). The taste control data vector component includes taste objects which define different taste dimensions (e.g., flavors) and intensities which are to be output by a flavor generator of the XR device 150 to the user. The smell control data vector component includes smell objects which define different smell dimensions (e.g., scents) and intensities which are to be output by a smell generator of the XR device 150 to the user. The touch feedback control data vector component includes touch feedback objects which define different tactile feedback devices of the XR device 150 that are to be activated (e.g., finger, hand, arm, leg, head, body positioned tactile feedback devices) and the intensities which are to be generated by the activated tactile feedback devices to the user. The temperature feedback control data vector component includes temperature objects which define temperatures which are to be provided by at least one thermal heating and/or cooling device (finger, hand, arm, leg, head, body positioned thermal heating and/or cooling devices) of the XR device 150 to the user. The sensed user input data component can characterize sensed movements and/or poses of the user's fingers, hands, arms, legs, head, eyes, mouth, etc.

As used herein, the term "pose" refers to the position and/or the rotational angle of one object (e.g., finger, arm, leg, etc.) relative to another object and/or to a defined coordinate system. A pose may therefore be defined based on only the multidimensional position of one object relative to another object and/or relative to a defined coordinate system, based on only the multidimensional rotational angles of the object relative to another object and/or to a defined coordinate system, or based on a combination of the multidimensional position and the multidimensional rotational angles. The term "pose" therefore is used to refer to position, rotational angle, or combination thereof.

Further operations are now explained with reference to FIGS. 4 and 9 which may be performed by the XR environment server 100 to determine 902 relevance of individual objects of different types of components of an input XR data meta-frame to interests of the user of the XR device 150, to adjust 904 renderable details of the individual objects responsive to the determined relevance to the interests of the user to the individual objects, and to generate 906 compressed output XR data meta-frames from the input XR data meta-frames based on the adjusted renderable details of the individual objects.

In the context of a video data component of the input XR data meta-frame, the operations for determining 902 relevance can include determining relevance of individual ones of video objects of the video data component of the input XR data meta-frames to the interests of the user of the XR device 150. The operations for adjusting 904 renderable details of the individual objects responsive to the determined relevance to the interests of the user to the individual objects can include adjusting renderable detail of individual ones of the video objects of the video data component which are to be displayed by a display of the XR device 150 to the user, responsive to the determined relevance of the individual ones of the video objects to the interests of the user.

In the context of an audio data component of the input XR data meta-frame, the operations for determining 902 relevance can include determining relevance of individual ones of audio objects of an audio data component of the input XR data meta-frames to the interests of the user of the XR device 150. The operations for adjusting 904 renderable details of the individual objects responsive to the determined relevance to the interests of the user to the individual objects can include adjusting renderable detail of individual ones of the audio objects of the audio data component which are to be audibly output by a speaker of the XR device 150, responsive to the determined relevance of the individual ones of the audio objects to the interests of the user.

In the context of a taste control data vector component of the input XR data meta-frame, the operations for determining 902 relevance can include determining relevance of individual ones of taste objects of the taste control data vector component of the input XR data meta-frames defining different taste dimensions and intensities which are to be output by a flavor generator of the XR device 150 to the user, to the interests of the user of the XR device 150. The operations for adjusting 904 renderable details of the individual objects responsive to the determined relevance to the interests of the user to the individual objects can include adjusting size of individual ones of the taste objects of the taste control data vector component defining the taste dimensions and intensities which are to be rendered as output of the flavor generator of the XR device 150 to the user, responsive to the determined relevance of the individual ones of the taste objects to the interests of the user. The flavor generator of the XR device 150 may be any device which is configured to provide various selectable flavor taste components toward the tongue of the user's mouth, and where the flavor taste components that are combined to render a particular taste are defined by the taste control data vector component of the compressed output XR data meta-frames communicated to the XR device 150.

In the context of a smell control data vector component of the input XR data meta-frame, the operations for determining 902 relevance can include determining relevance to the interests of the user of the XR device 150 of individual ones of smell objects of a smell control data vector component of the input XR data meta-frames, which define different smell dimensions and intensities which are to be output by a smell generator of the XR device 150 to the user. The operations for adjusting 904 renderable details of the individual objects responsive to the determined relevance to the interests of the user to the individual objects can include adjusting size of individual ones of the smell objects of the smell control data vector component defining the smell dimensions and intensities which are to be rendered by output of the smell generator of the XR device 150 to the user, responsive to the determined relevance of the individual ones of the smell objects to the interests of the user. The smell generator of the XR device 150 may be any device which is configured to provide various selectable smell components toward the nose of the user, and where the smell components that are combined to render a particular smell are defined by the smell control data vector component of the compressed output XR data meta-frames communicated to the XR device 150. In an example embodiment, adjusting 904 renderable details can correspond to reducing the quantity of different scents and/or intensities of different scents that are dispensed by the smell generator of the XR device. In another example, the smell objects can include objects identified as 'good' and 'bad', and then the smell objects identified as 'bad' may be removed in the output of smell generator of the XR device 150.

Figure 5:
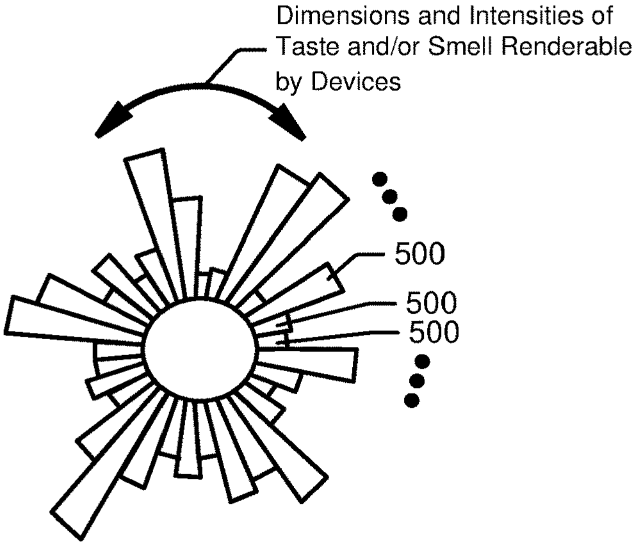
FIG. 5 illustrates a visual representation of dimensions and intensities of taste components and/or smell components which are renderable by a flavor generator and/or a smell generator, respectively, in accordance with some embodiments.

FIG. 5 illustrates a visual representation of dimensions and intensities of taste components and/or smell components which are renderable by a flavor generator and/or a smell generator, respectively. Different dimensions are illustrated as corresponding to different radially extending spokes 500 which are arranged around a center. The intensity of each of the dimensions is illustrated by the radial length of each spoke 500, where a greater intensity can correspond to a greater radial length of the spoke 500 and a lesser intensity can correspond to a less radial length of the spoke 500, or vice versa. The operation to adjust 904 renderable details of the taste control data vector component of the input XR data meta-frame and/or the smell control data vector component of the input XR data meta-frame can correspond to reducing the number of different dimensions (e.g., reduce the number of different spokes in FIG. 5) and/or reducing the number of intensities (e.g., reduce the number of different size intensities, e.g., step size, which can be indicated by a data vector component in FIG. 5) which are defined in the compressed output XR data meta-frames relative to the input XR data meta-frames. Thus, for example, the size of the compressed output XR data meta-frames can be substantially compressed by reducing the number of different dimensions from the 33 different spokes 500 illustrated in FIG. 5 to only four which are determined to be most relevant to the interests of the user, such as the four flavors and/or smells which are most closely associated with a video object in the user's eye focus. Similarly, the size of the compressed output XR data meta-frames can be substantially compressed by reducing the number of different intensity levels (i.e., number of spokes 500 illustrated in FIG. 5) to substantially fewer intensity levels for flavors and/or smells which are determined to be most relevant to the interests of the user.

In some embodiments, objects have a defined number of dimensions. For example, a scene of an XR environment may be defined by objects having five sense dimensions, such as vision, audio, smell, touch and taste. Each dimension may include a defined number of objects. For example, three types of objects can be background, object of activity, and salient objects in the background. The background can be relevant for vision, audio and smell. Apart from the objects related to the current activity, there are other objects in the scene as the background. These in general require low resolution data because they are "out of focus." The object of activity can be relevant for all senses, and can be the objects directly related to the user's present activity. The object of activity may be provided full resolution data, such as where the user's eye is focused (e.g., foveated rendering) in the XR environment; audio of a concert the user is listening to in the XR environment; smell, touch and taste of a virtual food the user is virtually eating in the XR environment; touch of a virtual object the user is inspecting in the XR environment, etc. Salient objects in the background can be relevant for vision, audio and smell. Even though not related to the activity, salient objects in the background may be prominent enough to draw attention of the user. For example, a strong smell that could warn of danger, a peculiar sound or a moving object.

Figure 11:
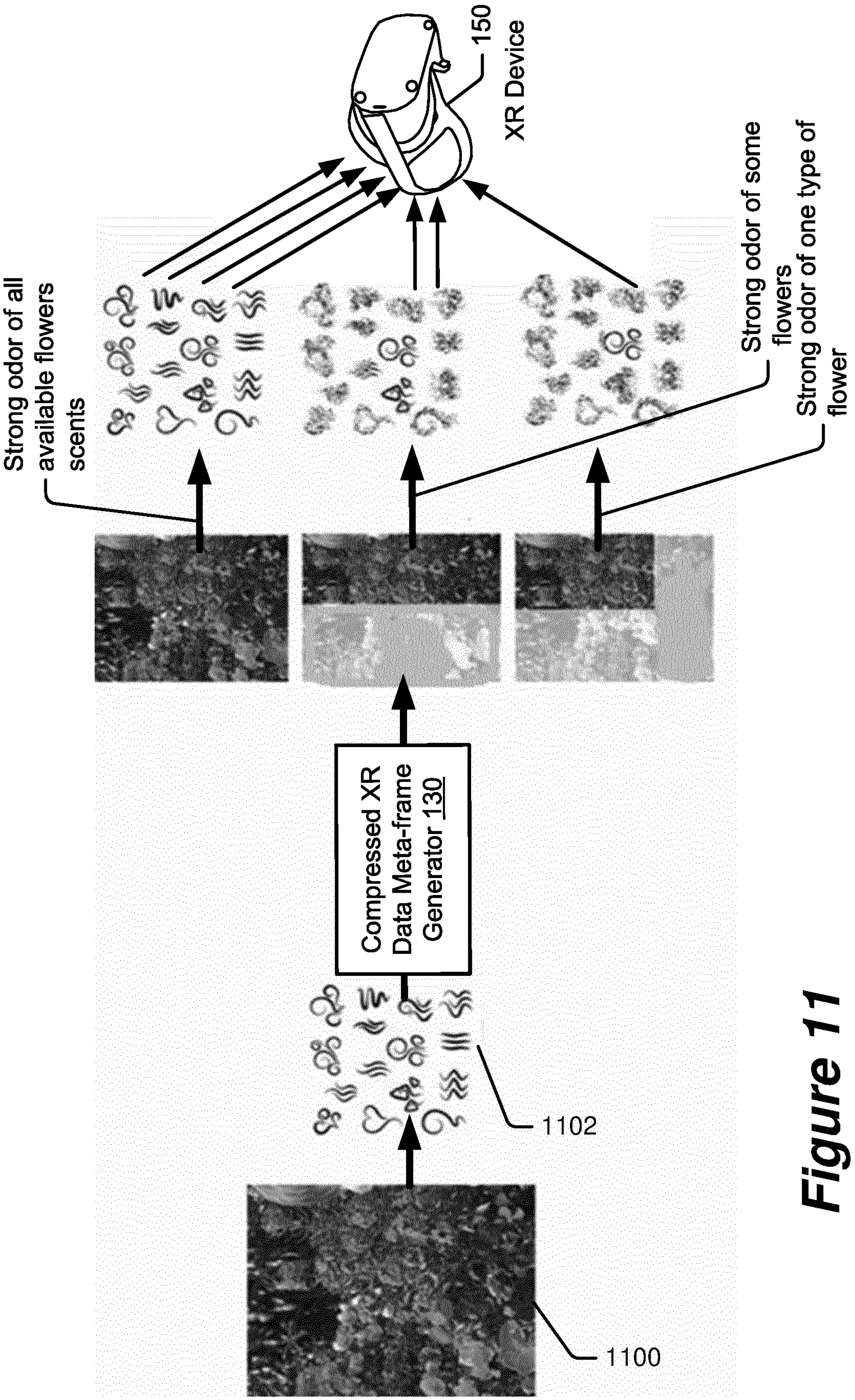
FIG. 11 illustrates operations that may be performed by the XR environment server to compress a smell control data vector component of an input XR data meta-frame, in accordance with some embodiments.

FIG. 11 illustrates operations that may be performed by the XR environment server 100, via the compressed XR data meta-frame generator 130, to compress a smell control data vector component of an input XR data meta-frame, in accordance with some embodiments. Referring to FIG. 11, a video frame 1100 shows flowers in a garden. The input XR data meta-frame includes a smell control data vector component 1102 which defines smell objects for each of the different types of flowers shown in in the video frame 1100. The compressed XR data meta-frame generator 130 determines the relevance of individual ones of the smell objects to the interests of the user of the XR device 150, such as by determining which one(s) of the flowers are closest to or within a threshold distance to a center location of the user's focus in the video frame 1100 and/or determining which one(s) of the flowers are being virtually touched by the user's hand (e.g., based on correlating the user's hand pose in the real-world to the virtual pose in the video frame 1100. The compressed XR data meta-frame generator 130 can eliminate any of the smell objects which are not determined to be relevant to the interests of the user, such as by not satisfying a relevance rule (e.g., not being closest to or within the threshold distance) from being a part of the compressed XR data meta-frame provided to the XR device 150 including the smell generator, and/or can reduce the intensity of the smell objects and/or renderable details of the smell objects which are not determined to be relevant to the interests of the user. In the example of FIG. 11, the compressed XR data meta-frame generator 130 may output a strong odor of all available flowers scents (red, yellow and orange flowers) when all of the corresponding flowers are determined to be relevant to the user's interests, may output a strong odor of only some flowers (for example, yellow and red flower scents) when those colored flowers are determined to be relevant to the user's interests, and may output a strong odor of only flower scent (for example, yellow) when that colored flower is determined to be relevant to the user's interests.

In the context of a touch feedback control data vector component of the input XR data meta-frame, the operations for determining 902 relevance can include determining relevance to the interests of the user of the XR device 150 of individual ones of touch feedback objects of a touch feedback control data vector component of the input XR data meta-frames defining different tactile feedback devices of the XR device 150 which are to be activated and the intensities which are to be generated by the activated tactile feedback devices to the user. The operations for adjusting 904 renderable details of the individual objects responsive to the determined relevance to the interests of the user to the individual objects can include adjusting size of individual ones of touch feedback objects of the touch feedback control data vector defining which tactile feedback devices are to be activated and the intensities which are to be generated by the activated tactile feedback devices to the user, responsive to the determined relevance of the individual ones of the touch feedback objects to the interests of the user. The tactile feedback devices of the XR device 150 may be any device which is configured to provide tactile feedback to the user, such as by provide touch (e.g., push/pull), vibration, etc. to the user's finger(s), hand(s), arms, foot(feet), leg(s), body, head, etc. responsive to the touch feedback objects of the touch feedback control data vector component received in the compressed XR data meta-frames.

In the context of a temperature feedback control data vector component of the input XR data meta-frame, the operations for determining 902 relevance can include determining relevance to the interests of the user of the XR device 150 of individual ones of temperature objects of a temperature feedback control data vector component of the input XR data meta-frames defining temperatures which are to be provided by at least one thermal heating and/or cooling device of the XR device 150 to the user. The operations for adjusting 904 renderable details of the individual objects responsive to the determined relevance to the interests of the user to the individual objects can include adjusting size (e.g., number of bits) of individual ones of the temperature objects of the temperature feedback control data vector component defining the temperature which is to be provided by the at least one thermal heating and/or cooling device of the XR device 150 to the user, responsive to the determined relevance of the individual ones of the temperature objects to the interests of the user. The thermal heating and/or cooling device of the XR device 150 may be any device which is configured to provide heating and/or cooling to a part of the user, such as by provide heating and/or cooling sensation to the user's finger(s), hand(s), arms, foot(feet), leg(s), body, head, etc. responsive to the temperature objects of the temperature feedback control data vector component received in the compressed XR data meta-frames. Thus, for example, the temperature feedback control data vector component can be compressed by eliminating temperature objects which do not satisfy a relevance rule relating to the determined user's interests.

Figure 10:
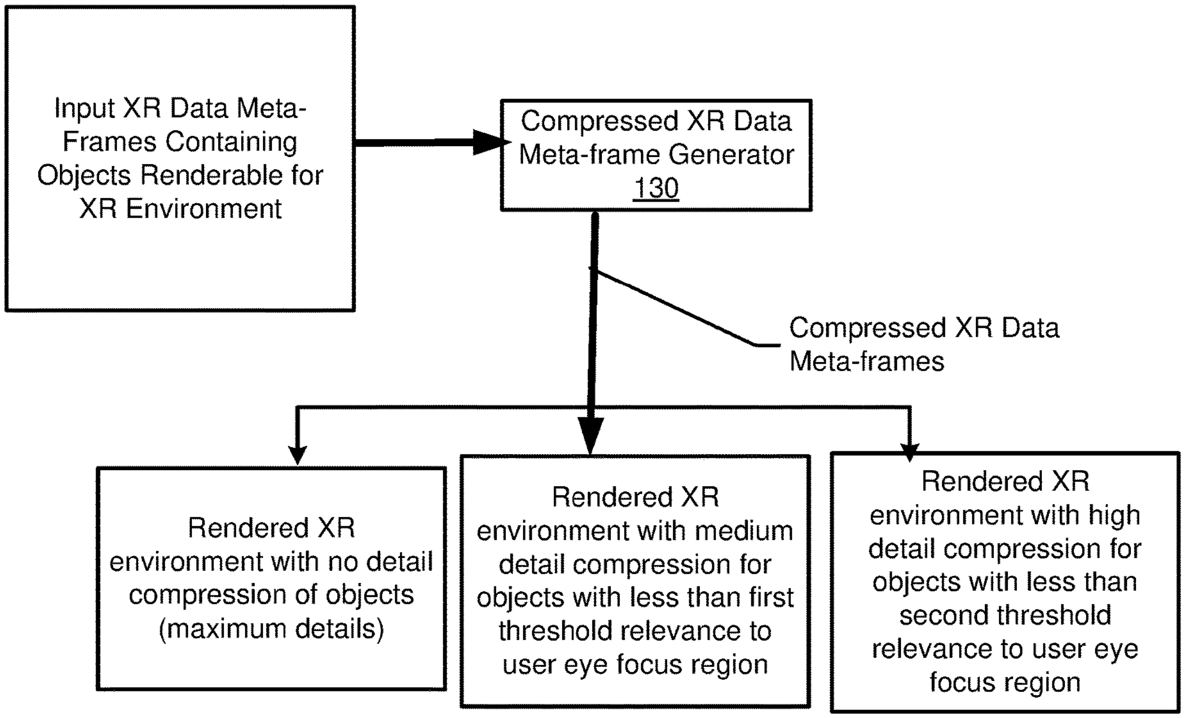
FIG. 10 illustrates more general operations that may be performed by the XR environment server to compress other types of components of an input XR data meta-frame, in accordance with some embodiments.

FIG. 10 illustrates more general operations that may be performed by the XR environment server 100, via the compressed XR data meta-frame generator 130, to compress other types of components of an input XR data meta-frame, in accordance with some embodiments. Referring to FIG. 10, the input XR data meta-frame contains objects which may be renderable by the XR device 150 to provide an XR environment to the user. The compressed XR data meta-frame generator 130 determines the relevance of the individual objects to the interests of the user of the XR device 150, such as explained in further detail below. In the example of FIG. 10, the compressed XR data meta-frame generator 130 may output a compressed output XR data meta-frame which enables maximum details to be rendered by the XR device 150 (e.g., with no detail compression of objects), may output a compressed output XR data meta-frame which provides medium detail compression (i.e., medium level of renderable details) for objects with less than a first threshold relevance to the user's eye focus region, and may output a compressed output XR data meta-frame which allows high detail compression (i.e., low level of renderable details) for objects with less than a second threshold relevance to the user's eye focus region, where the second threshold relevance is less than the first threshold relevance.

Various operations are now explained for how the XR environment server 100 may operate to determine relevance of individual object of interests to the user of the XR device 150, in accordance with some embodiments of the present disclosure. These operations can include using a machine learning model, such as the machine learning model 134 in FIG. 1.

In one embodiment, the operations to determine 902 relevance of the individual objects to interests of the user of the XR device 150, include identifying a user activity indicated by a sensed user input data component of the input XR data meta-frames. The indicated user input may correspond to an indication of any one or more of: finger movement and/or pose; hand movement and/or pose; arm movement and/or pose; leg movement and/or pose; head movement and/or pose, eye movement and/or pose, mouth movement and/or pose, spoken words, etc. The operations then determine the relevance of the individual objects to the user activity indicated by the sensed user input data component, based on processing a characteristic of the user activity through a machine learning model that has been defined to relate relevance of defined objects to defined user activities and/or which has been trained based on learned relevance of the defined objects to the defined user activities.

In a further embodiment, the operations to determine 902 relevance of the individual objects to interests of the user of the XR device 150, include to identify a region where the user's eyes are focused in the XR environment rendered from a video data component of the input XR data meta-frames. The operations then determine the relevance of the individual objects to the identified region, based on processing a characteristic of the identified region through a machine learning model that has been defined to relate relevance of defined objects to defined regions in the XR environment and/or which has been trained based on learned relevance of the defined objects to the defined regions in the XR environment.

In a further embodiment, the operations to determine 902 relevance of the individual objects to interests of the user of the XR device 150, include identifying an object is anomalous among the objects, based on determining the object has less than a threshold likelihood of occurring among the other objects based on processing a characteristic of the object through a machine learning model that has been defined to relate likelihood of defined objects occurring in the input XR data meta-frames and/or which has been trained based on learned likelihood of defined objects occurring in the input XR data meta-frames. The operations then determine the relevance of the object based on the anomalous identification. For example, when an rarely seen video object occurs, that video object can be identified as anomalous and cause the object interest relevance generator 132 to determine that video object to be highly relevant to the user's interests and further cause the compressed XR data meta-frame generator 130 to maintain a high level of detail in that video object and any other objects of other components that are determined to be relevant that video object (e.g., smells, tastes, temperature, etc. associated with that video object), while reducing the level of detail of other objects that are not relevant.

Accordingly, in some embodiments, relevance of various objects to user interests can be determined based on eye-tracking (vision) based on where a user is focused in the XR environment, touch (haptic) based on what virtual objects in the XR environment a user is interacting with, based on sentiments derived from the user's sensed facial expressions, based on measurements of the user's heart rate (e.g., raised heart rate), measurements of the user's breathing rate, measurements of the user's body temperature, etc. In a further embodiment, even in a scene of focus, there may be many objects in the view of the user (because of the depth of the scene), or contributing to the sense (e.g., due to different objects contributing to the final smell of a new car—including petrol, leather and etc.). Hence, the user's interest level can be determined to be distributed among the objects and result in smaller, divided interest being determined across the set of each of the objects in the scene. On the other hand, when the user has zoomed-in on a particular object, it could fill the user's display view and hence the interest is not divided such that the particular object is determined to of high interest to the user.

In some embodiments, relevance of an object may be determined based on the objects criticality, such as when an object is critical in a present situation and/or task being performed in the XR environment, which results in assignment of a higher interest level. The same task occurring in a different situation or the same situation but in a different task can result in assignment of a different interest level to the objects.

In some embodiments, relevance of an object may be determined based on situation, such as the user's defined personal preferences, user history, user's place and time, user's current task, etc.

In some embodiments, relevance of an object may be determined based on which object(s) are moving, such that movement and/or speed of an object is used in determining its relevance to the user's interests.

In some embodiments, relevance of an object may be determined based on social environment. For example, most a user who is a troubleshooter who is known to be responsible for investigating power cables first, can have power-related objects in the XR environment assigned a highest relevance to the user's interest.

Figure 3:
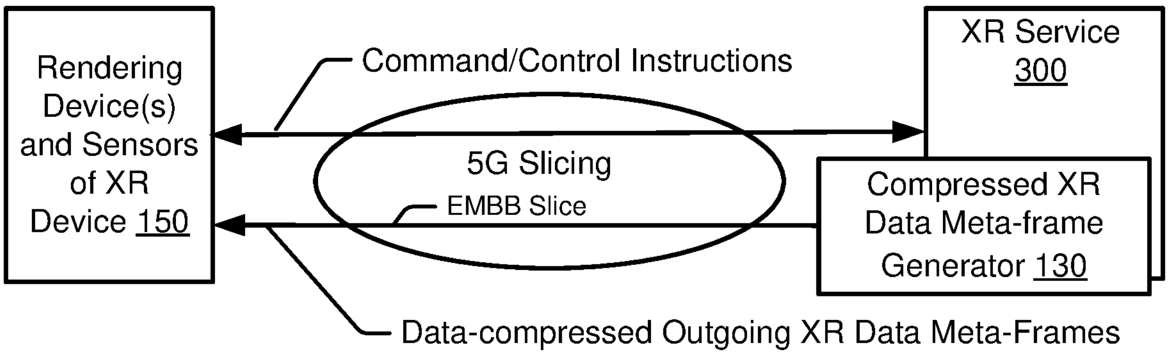
FIG. 3 illustrates an exemplary messaging between an XR environment server and rendering device(s) and sensors of an XR device in accordance with some embodiments.

FIG. 3 illustrates example messaging between an XR environment server 100 and rendering device(s) and sensors of an XR device 150 in accordance with some embodiments. Referring to FIG. 3, the sensed user input data, e.g., user control inputs, and other data communicated by the XR device 150 to enable the XR environment server 100 to determine 902 level-of-interest, may be transmitted from the XR device(s) 150 to the XR environment server 100 using fast, guaranteed QoS channels. In some embodiments, the channels are implemented using Ultra-Reliable Low Latency Communication (URLLC) slices, which were introduced in 3GPP release 15 to address the requirements of ITU-R M.2083 URLLC for 5G. The meta-frames can be transmitted via enhanced Mobile Broadband (EMBB) slices. Through the compression operations, the amount of transmitted data is decreased on the EMBB slice by sending only the necessary or determined level of details of object based on relevance to the user's interests. In this manner, the communication can be optimized, network capacity can be more effectively used, and the network performance can improve.

Figure 6:
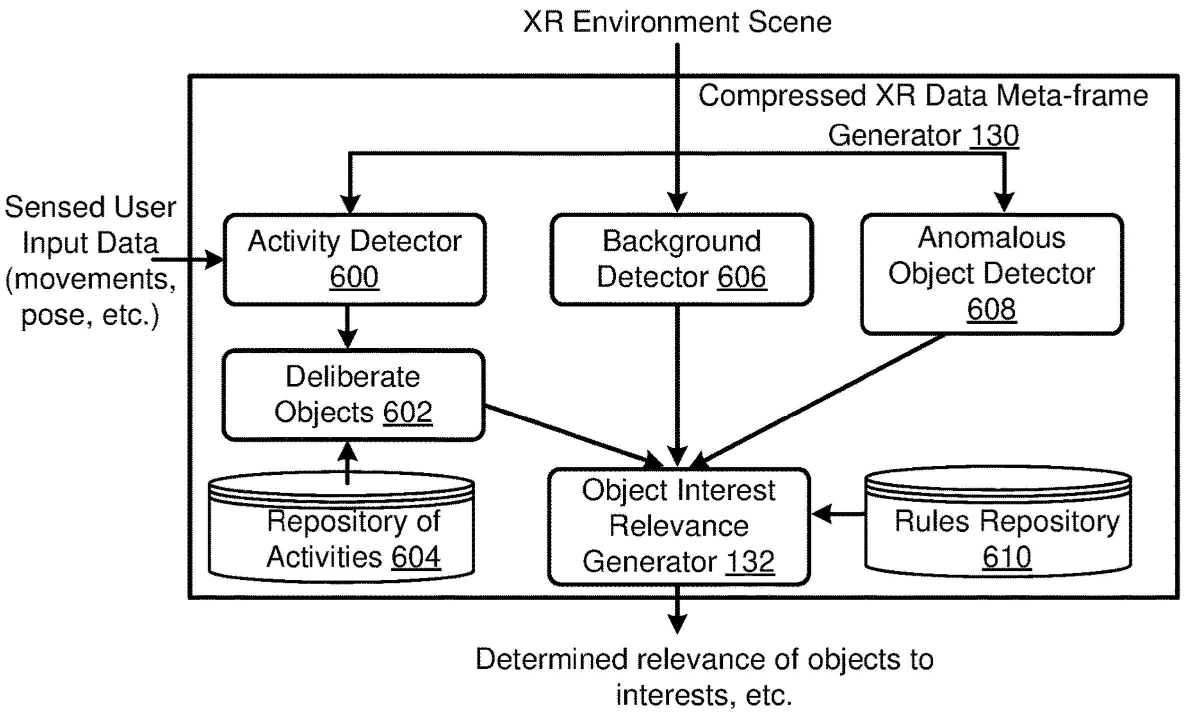
FIG. 6 illustrates a block diagram of components of the compressed XR data meta-frame generator which are configured in accordance with some embodiments.

FIG. 6 illustrates a block diagram of components of the compressed XR data meta-frame generator 130 which are configured in accordance with some embodiments. Referring to FIG. 6, objects of an XR environment scene are processed by an activity detector 600, which can receive sensed user input data (e.g., sensed movement(s), pose(s), etc.), by a background detector 606, and an anomalous object detector 608. A module 602 identifies deliberate objects (which are of-interest to the user) based on output of the activity detector 600 and input from a repository 604 of activities related to the XR environment scene. An object interest relevance generator 132 determines relevance of the various objects of the XR environment scene to interests of the user based on output of the module 602, output of the background detector 606, and output of the anomalous object detector 608, to access a rules repository 610 which relates relevance of those inputs to interests of the user and/or which has been trained based on learned relevance of those inputs to the interests of the user.

The activity detector 600 may operate to labels current activity of the user with the sequence of inputs from the XR data meta-frames and the control and movements of the user. A machine learning model may be used which is trained to detect activity. The anomalous object detector 608 may operate to identify the anomalous objects/elements in the XR environment scenes. Anomaly detection may be performing using a machine learning model which tracks sequences of frames and identify anomalous objects in the current frame. The background detector 606 may operate to extract from metadata associated with the audio/video/smell object data of the frame produced by the XR application 122. In case of vision, the entire video frame may be identified as the background. The repository 604 of activities may be a knowledge base of activities associating activities and subject and object of such activities. The module 602 may operate to extract the objects from the scene, and produces a list of objects that are related to the activity in a graded manner, where the objects that are related most directly to the activity are listed first and so on. The object interest relevance generator 132 may operate to add the interest levels (in the scales defined for each sense), which in one embodiment may be purely rule based.

In some embodiments, the XR environment server 100 may operate to obtain an XR environment scene produced by the XR application 122 and the sensed user input data, which can correspond to images of the user from, e.g., a camera directed toward the user's face and sensors configured to sense movement and/or pose of the user's fingers, hands, mouth, eyes, etc. The object interest relevance generator 132 estimates the user's eye focus, the user's activity, and the object in the scene that are being sensed by the user. The object interest relevance generator 132 may access the repository of activities 604 to find objects related to the activity in a prioritized order. For the vision dimension, the generator 132 may provide full resolution for a pixel region where the user's eyes are focused, graded resolution for the objects related to activity, and low resolution for the rest of the scene. For the audio dimension, the generator 132 may provide graded resolution sound for the audio objects for activity, low or medium resolution for the background sound, and full resolution for anomalous audio patterns, and/or a customized pattern of resolution so that when the activity focused objects are not present, full resolution for background audio. For the smell dimension, the same operations may be performed as for audio objects, but produce the resolution data as a vector. For the touch and taste dimensions, the generator 132 may provide graded resolution data for the touch/taste objects for activity, full resolution for anomalous touch/taste patterns, and produce the resolution data as a vector. The final meta-frame includes the compressed (e.g., filtered) video and audio content and compressed (e.g., filtered) smell/touch/taste control data.

The operations by the XR environment server 100 relating to adjusting 904 renderable details of the individual objects can be responsive to defined limitations of on a maximum level of detail which the XR device 150 can render for defined objects. For example, although though the application may generate a standard set of dimensions and intensities so as to support interoperability among different types of XR devices 150, some of the XR devices 150 may have limitations in their ability to render objects, such as: their display resolution; number of speakers and/or speaker output frequency range; number and/or intensity of scents that can be generated; number and/or intensity of smells that can be generated; number, location on user, and/or intensity of tactile user feedback that can be generated; etc. In some embodiments, the XR environment server 100 performs an appropriate mapping of the standard dimensions and intensity range to be within the XR device rendering range of operation. This mapping information can be sent to the compressed XR data meta-frame generator 130 to initialize or otherwise control output of the rules repository 610. The object interest relevance generator 132 can then use this to reduce the control vector sizes (both number of dimensions and the range of values) which is specific to the XR device.

Some further embodiments of the present disclosure are directed to using a machine learning model for determining the relevance of objects to interests of the user of the XR device 150. The machine learning model may be a supervised or unsupervised model, and may be adapted through supervised training and/or unsupervised learning based on identifying patterns in data sets and then classifying the patterns.

As was briefly explained above, the operation to determine relevance of the individual objects to interests of the user of the XR device 150, can include processing various user activities, objects in the XR data meta-frame, and other characteristics and information as inputs to be processed through a machine learning model that has been defined to relate relevance of defined objects to these inputs and/or which has been trained based on learned relevance of the defined objects to these inputs.

Figure 7:
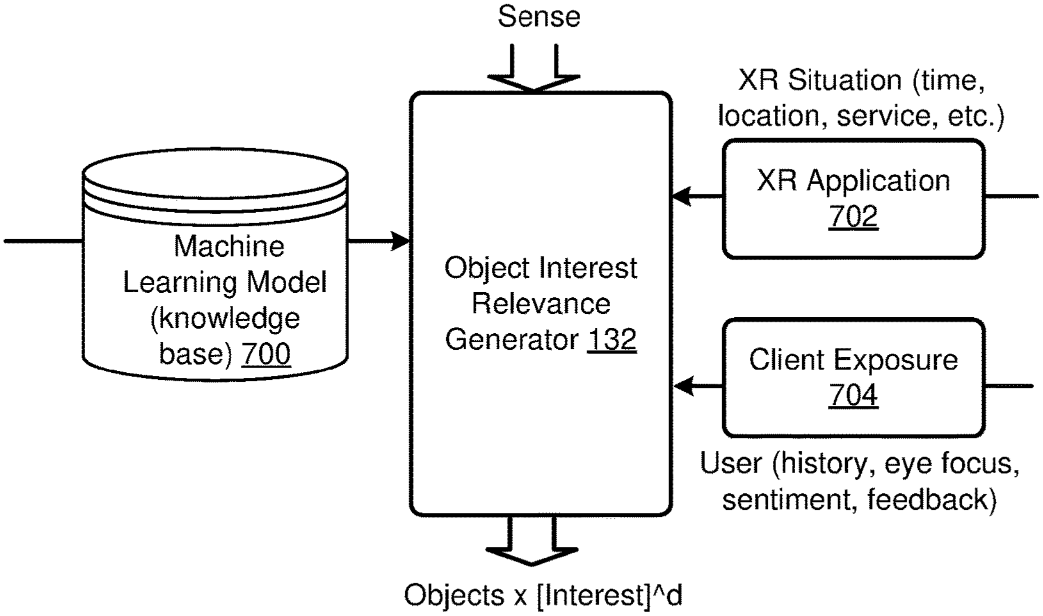
FIG. 7 illustrates a block diagram of example inputs to the object interest relevance generator which is configured in accordance with some embodiments.

FIG. 7 illustrates a block diagram of example inputs to the object interest relevance generator 132 which is configured in accordance with some embodiments. The inputs can include client exposure characteristics 704, such as: user history of experiencing the XR environment; user's eye focus in the XR environment; user sentiment; user's virtual touch interaction with object(s); level of variable zoom performed by the user to zoom-in or zoom-out on viewable objects, audible objects, smell objects, etc. Other inputs can include XR application 702 outputs, such as location and/or pose within the XR environment, actions occurring in the XR environment, service(s) being provided to the user, etc. For the vision sense, an example input may be in following form: Situation<Street 32 Madrid, G-Glass operated by S-Note 10, etc.>; Person<ID1876; etc>; Service<Football match, etc.>. Other inputs can be provided from a machine learning model, such as the knowledge base 700, which can be populated using static and/or dynamic updates. The input received from the knowledge base 700 can be narrowed down by the object interest relevance generator 132 based on the received data from the client exposure characteristics 704 and/or the XR application 702 outputs.

The machine learning model may include a neural network architecture, such as a deep neural network (DNN) or other neural network circuit. In some embodiments, the XR environment server 100 includes a neural network circuit having an input layer having input nodes, a sequence of hidden layers each having a plurality of combining nodes, and an output layer having at least one output node. The operations can include to train weights assigned to the input nodes and the combining nodes based on learned relevance of the objects defined by the input XR data meta-frames to interests of the user of the XR device 150.

The determination of the relevance of the individual objects to interests of the user of the XR device 150, can include operating the input nodes of the input layer to each receive a value of one of a plurality of different types of components of the input XR data meta-frames, each of the input nodes multiplying the value that is inputted by the weight that is assigned to the input node to generate a weighted value, and when the weighted value exceeds a firing threshold assigned to the input node to then provide the weighted value to at least a plurality of the combining nodes of the first one of the sequence of the hidden layers. The determination further includes operating the combining nodes of the first one of the sequence of the hidden layers using the weights that are assigned thereto to multiply and combine the weighted values provided by the input nodes to generate combined weighted values, and when the combined weighted value generated by one of the combining nodes exceeds a firing threshold assigned to the combining node to then provide the combined weighted value to at least a plurality of the combining nodes of a next one of the sequence of the hidden layers. The determination further includes operating the combining nodes of a last one of the sequences of hidden layers using the weights that are assigned thereto to multiply and combine the combined weighted values provided by the at least the plurality of combining nodes of a previous one of the sequences of hidden layers to generate final combined weighted values, and when the final combined weighted value generated by one of the combining nodes of the last one of the sequences of hidden layers exceeds an assigned firing threshold to then provide the final combined weighted value to the output node of the output layer. The determination further includes operating the at least one output node of the output layer to combine the final combined weighted values provided by the combining nodes of the last one of the sequences of hidden layers to generate at least one output value. The determination of the relevance of the objects to the interests is then based on the at least one output value from the at least one output node of the output layer.

In a further example embodiment, the vision sense is fed to a sub neural network, such as a convolutional neural network (CNN). The CNN is pre-trained to detect the main elements of the received sensory information (e.g., vision). Using several pooling (e.g., hidden) layers, the objects in the sense are reduced, and a subset of them are fed into the later feedforward neural network (FNN). The FNN also receives the XR application outputs 702 and the client exposures 704, such as the control vector data component of the input XR data meta-frames, and outputs the interest levels for the objects.

Figure 8:
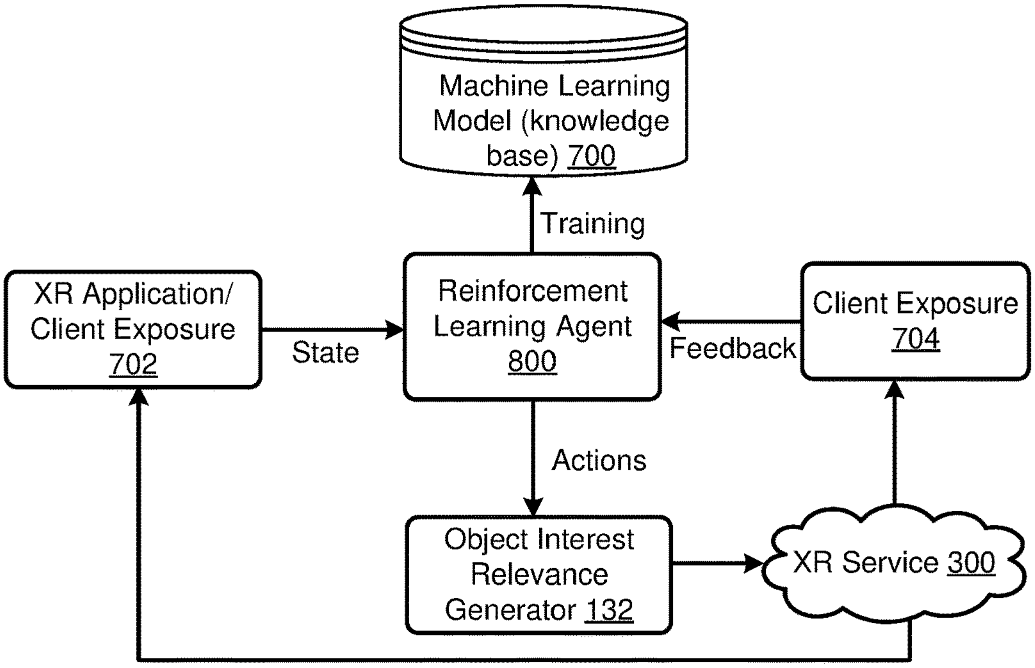
FIG. 8 illustrates a block diagram of example feedback training by a Reinforcement Learning agent of a machine learning model in accordance with some embodiments.

FIG. 8 illustrates a block diagram of example feedback training by a Reinforcement Learning (RL) agent 800 of a machine learning model 700. When the internal NNs of the object interest relevance generator 132 are pretrained, there may be a mismatch between experience of the user and what has been trained in the object interest relevance generator 132. Towards resolving this discrepancy, the RL agent 800 may be used on top of the DNN for online configuration of the learning modules, e.g. regularization parameters, and triggering the retraining process. The RL agent 800 can be configured to receive the state from the exposure pipelines, and configures the object interest relevance generator 132. Then, based on continuous monitoring of the client exposure 704 and the XR application 702 while the XR service 300 is being provided to the user, the RL agent learns how to configure the object interest relevance generator 132. The learning outcomes of this agent are also added to the knowledge base 700 for later use.

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. An extended reality, XR, environment server for communicating XR data meta-frames through networks to an XR device for rendering as an XR environment, the XR environment server comprising:
- a network interface configured to communicate through the networks;
- at least one processor; and
- at least one memory storing instructions executable by the at least one processor to perform operations to:
  - obtain input XR data meta-frames which define objects for rendering as the XR environment through the XR device to a user;
  - determine relevance of the individual objects to interests of the user of the XR device;
  - adjust renderable details of the individual objects responsive to the determined relevance to the interests of the user to the individual objects;
  - generate compressed output XR data meta-frames from the input XR data meta-frames based on the adjusted renderable details of the individual objects; and
  - communicate the compressed output XR data meta-frames through the network interface toward the XR device for rendering.

2. The XR environment server of claim 1, wherein:
- the determination of relevance of the individual objects to the interests of the user of the XR device, comprises
  - determining relevance of individual ones of video objects of a video data component of the input XR data meta-frames to the interests of the user of the XR device; and
- the adjustment of renderable details of the individual objects responsive to the determined relevance to the interests of the user to the individual objects, comprises:
  - adjusting renderable detail of individual ones of the video objects of the video data component which are to be displayed by a display of the XR device to the user, responsive to the determined relevance of the individual ones of the video objects to the interests of the user.

3. The XR environment server of claim 1, wherein:
- the determination of relevance of the individual objects to the interests of the user of the XR device, comprises determining relevance of individual ones of audio objects of an audio data component of the input XR data meta-frames to the interests of the user of the XR device; and the adjustment of renderable details of the individual objects responsive to the determined relevance to the interests of the user to the individual objects, comprises adjusting renderable detail of individual ones of the audio objects of the audio data component which are to be audibly output by a speaker of the XR device, responsive to the determined relevance of the individual ones of the audio objects to the interests of the user.

4. The XR environment server of claim 1, wherein:

the determination of relevance of the individual objects to the interests of the user of the XR device, comprises determining relevance of individual ones of taste objects of a taste control data vector component of the input XR data meta-frames defining different taste dimensions and intensities which are to be output by a flavor generator of the XR device to the user, to the interests of the user of the XR device; and the adjustment of renderable details of the individual objects responsive to the determined relevance to the interests of the user to the individual objects, comprises adjusting size of individual ones of the taste objects of the taste control data vector component defining the taste dimensions and intensities which are to be rendered as output of the flavor generator of the XR device to the user, responsive to the determined relevance of the individual ones of the taste objects to the interests of the user.

5. The XR environment server of claim 1, wherein:

the determination of relevance of the individual objects to the interests of the user of the XR device, comprises determining relevance to the interests of the user of the XR device of individual ones of smell objects of a smell control data vector component of the input XR data meta-frames, which define different smell dimensions and intensities which are to be output by a smell generator of the XR device to the user; and the adjustment of renderable details of the individual objects responsive to the determined relevance to the interests of the user to the individual objects, comprises adjusting size of individual ones of the smell objects of the smell control data vector component defining the smell dimensions and intensities which are to be rendered by output of the smell generator of the XR device to the user, responsive to the determined relevance of the individual ones of the smell objects to the interests of the user.

6. The XR environment server of claim 1, wherein:

the determination of relevance of the individual objects to the interests of the user of the XR device, comprises determining relevance to the interests of the user of the XR device of individual ones of touch feedback objects of a touch feedback control data vector component of the input XR data meta-frames defining different tactile feedback devices of the XR device which are to be activated and the intensities which are to be generated by the activated tactile feedback devices to the user; and the adjustment of renderable details of the individual objects responsive to the determined relevance to the interests of the user to the individual objects, comprises adjusting size of individual ones of touch feedback objects of the touch feedback control data vector defining which tactile feedback devices are to be activated and the intensities which are to be generated by the activated tactile feedback devices to the user, responsive to the determined relevance of the individual ones of the touch feedback objects to the interests of the user.

7. The XR environment server of claim 1, wherein:

the determination of relevance of the individual objects to the interests of the user of the XR device, comprises determining relevance to the interests of the user of the XR device of individual ones of temperature objects of a temperature feedback control data vector component of the input XR data meta-frames defining temperatures which are to be provided by at least one thermal heating and/or cooling device of the XR device to the user; and the adjustment of renderable details of the individual objects responsive to the determined relevance to the interests of the user to the individual objects, comprises adjusting size of individual ones of the temperature objects of the temperature feedback control data vector component defining the temperature which is to be provided by the at least one thermal heating and/or cooling device of the XR device to the user, responsive to the determined relevance of the individual ones of the temperature objects to the interests of the user.

8. The XR environment server of any of claim 1, wherein the operation to determine relevance of the individual objects to interests of the user of the XR device, further comprises to:

identify a user activity indicated by a sensed user input data component of the input XR data meta-frames; and determine the relevance of the individual objects to the user activity indicated by the sensed user input data component, based on processing a characteristic of the user activity through a machine learning model that has been defined to relate relevance of defined objects to defined user activities and/or which has been trained based on learned relevance of the defined objects to the defined user activities.

9. The XR environment server of claim 1, wherein the operation to determine relevance of the individual ones to interests of the user of the XR device, further comprises to:

identify a region where the user's eyes are focused in the XR environment rendered from a video data component of the input XR data meta-frames; and determine the relevance of the individual objects to the identified region, based on processing a characteristic of the identified region through a machine learning model that has been defined to relate relevance of defined objects to defined regions in the XR environment and/or which has been trained based on learned relevance of the defined objects to the defined regions in the XR environment.

10. The XR environment server of claim 1, wherein the operation to determine relevance of individual objects to interests of the user of the XR device, further comprises to:

identify an object is anomalous among the objects, based on determining the object has less than a threshold likelihood of occurring among the other objects based on processing a characteristic of the object through a machine learning model that has been defined to relate likelihood of defined objects occurring in the input XR data meta-frames and/or which has been trained based on learned likelihood of defined objects occurring in the input XR data meta-frames; and determine the relevance of the object based on the anomalous identification.

11. The XR environment server of claim 1, wherein the operations further comprise to:

obtain rendering limitation information that characterizes a limitation on a maximum level of detail which the XR device can render for defined objects, wherein the generation of the compressed output XR data meta-frames comprises compensating for the rendering limitation information of the XR device in the adjustment of the renderable details from the input XR data meta-frames that are included in the output XR data meta-frames to be rendered by the XR device for the individual objects.

12. The XR environment server of claim 1, further comprising:

a neural network circuit having an input layer having input nodes, a sequence of hidden layers each having a plurality of combining nodes, and an output layer having at least one output node, and wherein the operations further comprise to train weights assigned to the input nodes and the combining nodes based on learned relevance of the objects defined by the input XR data meta-frames to interests of the user of the XR device.

13. The XR environment server of claim 12, wherein the determination of the relevance of the individual objects to interests of the user of the XR device, comprises:

operating the input nodes of the input layer to each receive a value of one of a plurality of different types of components of the input XR data meta-frames, each of the input nodes multiplying the value that is inputted by the weight that is assigned to the input node to generate a weighted value, and when the weighted value exceeds a firing threshold assigned to the input node to then provide the weighted value to at least a plurality of the combining nodes of the first one of the sequence of the hidden layers;

operate the combining nodes of the first one of the sequence of the hidden layers using the weights that are assigned thereto to multiply and combine the weighted values provided by the input nodes to generate combined weighted values, and when the combined weighted value generated by one of the combining nodes exceeds a firing threshold assigned to the combining node to then provide the combined weighted value to at least a plurality of the combining nodes of a next one of the sequence of the hidden layers;

operate the combining nodes of a last one of the sequences of hidden layers using the weights that are assigned thereto to multiply and combine the combined weighted values provided by the at least the plurality of combining nodes of a previous one of the sequences of hidden layers to generate final combined weighted values, and when the final combined weighted value generated by one of the combining nodes of the last one of the sequences of hidden layers exceeds an assigned firing threshold to then provide the final combined weighted value to the output node of the output layer; and operate the at least one output node of the output layer to combine the final combined weighted values provided by the combining nodes of the last one of the sequences of hidden layers to generate at least one output value, wherein the determination of the relevance of the objects to the interests is based on the at least one output value from the at least one output node of the output layer.

14. A method for communicating extended reality, XR, meta-frames from an XR environment server through a network to an XR device for rendering as an XR environment, the method comprising:

obtaining input XR data meta-frames which define objects for rendering through the XR device as the XR environment to a user;

determining relevance of individual objects to interests of the user of the XR device;

adjusting renderable details of the individual objects responsive to the determined relevance to the interests of the user to the individual objects;

generating compressed output XR data meta-frames from the input XR data meta-frames based on the adjusted renderable details of the individual objects; and communicating the compressed output XR data meta-frames through the network interface toward the XR device for rendering through the XR device.

15. The method claim 14, wherein:

the determining of relevance of the individual objects to the interests of the user of the XR device, comprises determining relevance of individual ones of video objects of a video data component of the input XR data meta-frames to the interests of the user of the XR device; and the adjusting renderable details of the individual objects responsive to the determined relevance to the interests of the user to the individual objects, comprises adjusting renderable detail of individual ones of the video objects of the video data component which are to be displayed by a display of the XR device to the user, responsive to the determined relevance of the individual ones of the video objects to the interests of the user.

16. The method of claim 14, wherein:

the determining of relevance of the individual objects to the interests of the user of the XR device, comprises determining relevance of individual ones of taste objects of a taste control data vector component of the input XR data meta-frames defining different taste dimensions and intensities which are to be output by a flavor generator of the XR device to the user, to the interests of the user of the XR device; and the adjusting renderable details of the individual objects responsive to the determined relevance to the interests of the user to the individual objects, comprises adjusting size of individual ones of the taste objects of the taste control data vector component defining the taste dimensions and intensities which are to be rendered as output of the flavor generator of the XR device to the user, responsive to the determined relevance of the individual ones of the taste objects to the interests of the user.

17. The method of claim 14, wherein:

the determining of relevance of the individual objects to the interests of the user of the XR device, comprises determining relevance to the interests of the user of the XR device of individual ones of smell objects of a smell control data vector component of the input XR data meta-frames, which define different smell dimensions and intensities which are to be output by a smell generator of the XR device to the user; and the adjusting renderable details of the individual objects responsive to the determined relevance to the interests of the user to the individual objects, comprises adjusting size of individual ones of the smell objects of the smell control data vector component defining the smell dimensions and intensities which are to be rendered by output of the smell generator of the XR device to the user, responsive to the determined relevance of the individual ones of the smell objects to the interests of the user.

18. The method of claim 14, wherein:

the determining of relevance of the individual objects to the interests of the user of the XR device, comprises determining relevance to the interests of the user of the XR device of individual ones of temperature objects of a temperature feedback control data vector component of the input XR data meta-frames defining temperatures which are to be provided by at least one thermal heating and/or cooling device of the XR device to the user; and the adjusting renderable details of the individual objects responsive to the determined relevance to the interests of the user to the individual objects, comprises adjusting size of individual ones of the temperature objects of the temperature feedback control data vector component defining the temperature which is to be provided by the at least one thermal heating and/or cooling device of the XR device to the user, responsive to the determined relevance of the individual ones of the temperature objects to the interests of the user.

19. The method of claim 14, wherein the determining relevance of the individual objects to interests of the user of the XR device, further comprises:

identifying an object is anomalous among the objects, based on determining the object has less than a threshold likelihood of occurring among the other objects based on processing a characteristic of the object through a machine learning model that has been defined to relate likelihood of defined objects occurring in the input XR data meta-frames and/or which has been trained based on learned likelihood of defined objects occurring in the input XR data meta-frames; and determining the relevance of the object based on the anomalous identification.

20. The method of claim 14, further comprising:

obtaining rendering limitation information that characterizes a limitation on a maximum level of detail which the XR device can render for defined objects, wherein the generating of the compressed output XR data meta-frames comprises compensating for the rendering limitation information of the XR device in the adjustment of the renderable details from the input XR data meta-frames that are included in the output XR data meta-frames to be rendered by the XR device for the individual.

* * * * *